US007790041B2

(12) United States Patent
Noelke et al.

(10) Patent No.: US 7,790,041 B2
(45) Date of Patent: Sep. 7, 2010

(54) REMOVING FLUOROSURFACTANT FROM AQUEOUS FLUOROPOLYMER DISPERSIONS

(75) Inventors: Charles Joseph Noelke, Wilmington, DE (US); Clay Woodward Jones, Washington, WV (US); Michael Gene McClusky, Washington, WV (US); David William Johnson, Washington, WV (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 1025 days.

(21) Appl. No.: 11/194,257

(22) Filed: Aug. 1, 2005

(65) Prior Publication Data

US 2006/0036021 A1  Feb. 16, 2006

Related U.S. Application Data

(60) Provisional application No. 60/600,694, filed on Aug. 11, 2004.

(51) Int. Cl.
*B01D 15/04* (2006.01)

(52) U.S. Cl. .................. 210/690; 523/310; 524/544; 526/242; 526/250

(58) Field of Classification Search ................. 210/690; 523/310; 524/544; 526/242, 250
See application file for complete search history.

(56) References Cited

U.S. PATENT DOCUMENTS

| 2,559,752 | A |   | 7/1951  | Berry |
| 2,749,307 | A | * | 6/1956  | Ellison ................... 210/94 |
| 2,863,889 | A |   | 12/1958 | Marks |
| 3,037,953 | A |   | 6/1962  | Marks et al. |
| 3,704,272 | A |   | 11/1972 | Holmes |
| 3,882,153 | A |   | 5/1975  | Seki et al. |
| 4,025,427 | A | * | 5/1977  | Loeb ....................... 210/675 |
| 4,282,162 | A |   | 8/1981  | Kuhls |
| 4,369,266 | A |   | 1/1983  | Kuhls et al. |
| 4,380,618 | A |   | 4/1983  | Khan et al. |
| 6,706,193 | B1 | * | 3/2004  | Burkard et al. ............ 210/662 |
| 6,720,437 | B2 | * | 4/2004  | Jones et al. ............... 554/191 |
| 6,833,403 | B1 | * | 12/2004 | Bladel et al. ............. 524/458 |
| 6,861,466 | B2 | * | 3/2005  | Dadalas et al. ........... 524/544 |
| 7,041,728 | B2 | * | 5/2006  | Zipplies et al. .......... 524/544 |
| 2002/0151748 | A1 |   | 10/2002 | Jones et al. |
| 2003/0054122 | A1 |   | 3/2003  | Forbes et al. |
| 2005/0070633 | A1 | * | 3/2005  | Epsch et al. ............. 523/310 |
| 2007/0023360 | A1 | * | 2/2007  | Noelke et al. ............ 210/690 |

FOREIGN PATENT DOCUMENTS

| EP | 0 818 506 B1 | 5/2000 |
| EP | 1 155 055 B1 | 4/2003 |

(Continued)

OTHER PUBLICATIONS

Internet Article "Continuous Ion Exchange", Rensselaer PolyTechnic Institute, Department of Chemical and Biological Engineering, Troy, NY http://www.rpi.edu/dept/chem-eng/Biotech-Environ/IONEX/continuo.htm, Apr. 18, 1995.

*Primary Examiner*—Peter D. Mulcahy
*Assistant Examiner*—Henry Hu

(57) ABSTRACT

A process for reducing the fluorosurfactant content of an aqueous fluoropolymer dispersion by filling a shipping container with fluoropolymer dispersion and contacting the dispersion with a fluorosurfactant sorbent in the shipping container.

18 Claims, 3 Drawing Sheets

FOREIGN PATENT DOCUMENTS

| | | | |
|---|---|---|---|
| EP | 1 364 972 A1 | 11/2003 | |
| EP | 1364972 A1 * | 11/2003 | |
| EP | 1 382 593 A2 | 1/2004 | |
| WO | WO-03/051988 A2 * | 6/2003 | |
| WO | WO 03/051988 A2 | 6/2003 | |
| WO | WO 2006/020721 A1 | 2/2006 | |

* cited by examiner

REMOVING FLUOROSURFACTANT FROM AQUEOUS FLUOROPOLYMER DISPERSIONS

FIELD OF THE INVENTION

This invention relates to a process for removing fluorosurfactant from aqueous fluoropolymer dispersions.

BACKGROUND OF THE INVENTION

As described In U.S. Pat. No. 2,559,752 to Berry, fluorosurfactants are used as a polymerization aid in the dispersion polymerization of fluoropolymers functioning as a non-telogenic dispersing agent. As has been further taught in U.S. Pat. No. 3,882,153 (Seki et al) and U.S. Pat. No. 4,282,162 (Kuhls), these expensive fluorosurfactants can be recovered either from the aqueous phase after the polymer has been coagulated from the dispersion or in the aqueous polymer dispersions prior to concentration. A preferred method of recovering the fluorosurfactant from the fluoropolymer dispersion as taught in both Kuhls and Seki et al. is by adsorption onto an ion exchange resin.

Fluoropolymer manufacturing processes that involve ion exchange adsorption as an added process step suffer from several disadvantages. For example, a process employing the addition of ion exchange resin to the dispersion in a stirred tank, typically in the form of resin beads, requires long contact times with stirring to effect the adsorption of the fluorosurfactant. In practical terms, the rate of adsorption is limited by the rate and efficacy of the stirring; the amount, bead size, and condition of the ion exchange resin; the relative chemical potentials of the particular ion exchange resin being used and anions to be exchanged; and the temperature. Because of such limitations, the recovery of the fluorosurfactant from the fluoropolymer dispersion using ion exchange resin as disclosed in the prior art takes a number of hours, i.e., typical treatment times longer than a typical polymerization cycle. Thus, in order to avoid increasing the length of the total manufacturing cycle time, either multiple tanks or a tank large enough to receive several polymerization batches must be used and the ion exchange step must be run with high production efficiency.

Another disadvantage of the prior art method is that the shearing forces associated long stirring times has the propensity to cause some agglomeration of the primary polymerization particles forming large particles resulting in poorer dispersion stability due to particle settling. Further, the amount of ion exchange resin necessary with the prior art method to keep the time of the ion exchange adsorption short so as to keep up with batch polymerization cycles can require about 3 times the amount necessary to achieve the same level of fluorosurfactant reduction that could be achieved if longer contact times of a week or more were available.

If the dispersion is passed through a fixed bed of ion exchange instead of using stirred resin beads, the rate of exchange is also slow, limited by the necessity of the dispersion to pass through the bed at a sufficiently slow rate to provide adequate fluorosurfactant adsorption. The slow passage through the ion exchange bed leads to the first portion of the dispersion having all of the fluorosurfactant removed. Later portions have lesser amounts removed as the top of the bed becomes progressively more exhausted. The final portion may have little of the fluorosurfactant removed as the bed reaches exhaustion. Care must be exercised in later blending so that the final product does not vary as a result of differences in bed exhaustion. Moreover, much labor or capital for mechanical equipment must be employed to replenish or replace the ion exchange resin in the vessel containing the fixed bed. The overall rate compares with the stirred bead technique.

What is desired is an efficient manufacturing process for fluoropolymer dispersion which recovers fluorosurfactant directly from dispersion without increasing the dispersion production cycle time, avoids the need for larger scale production equipment, and provides high quality, uniform product without shearing damage and particle agglomeration.

BRIEF SUMMARY OF THE INVENTION

The present invention relates to a process for reducing the fluorosurfactant content of an aqueous fluoropolymer dispersion by filling a shipping container with fluoropolymer dispersion and contacting the dispersion with a fluorosurfactant sorbent in the shipping container to reduce fluorosurfactant content.

The process preferably includes moving either the aqueous fluoropolymer dispersion or the sorbent to impart movement in relation to each other during the contacting. In preferred embodiments, the sorbent is an ion exchange resin and is confined. Preferably, the sorbent is separated from the dispersion after the fluorosurfactant content of the dispersion is reduced allowing for recovery of fluorosurfactant from the sorbent.

The invention further provides a system for reducing the fluorosurfactant content of an aqueous fluoropolymer dispersion that includes a shipping container for the dispersion and a fluorosurfactant sorbent, the sorbent being disposed in the container for contacting the dispersion to reduce fluorosurfactant content. In a preferred embodiment the sorbent is confined in a confinement structure, preferably a fabric pouch. In an alternate embodiment, the confinement structure is a generally rigid porous enclosure. In another embodiment, a pump is used for moving the fluorosurfactant-containing aqueous fluoropolymer dispersion in relation to the confinement structure and the confinement structure is a cartridge with a porous exterior and a central interior passage. Sorbent is contained between the central interior passage and the porous exterior so that flow from the pump into the central passage causes the dispersion to flow through the sorbent and out the porous exterior. Preferably, the cartridge has a collector for receiving dispersion with reduced fluorosurfactant content that will return the dispersion to the shipping container promoting circulation.

DETAILED DESCRIPTION OF THE INVENTION

Figure 1:
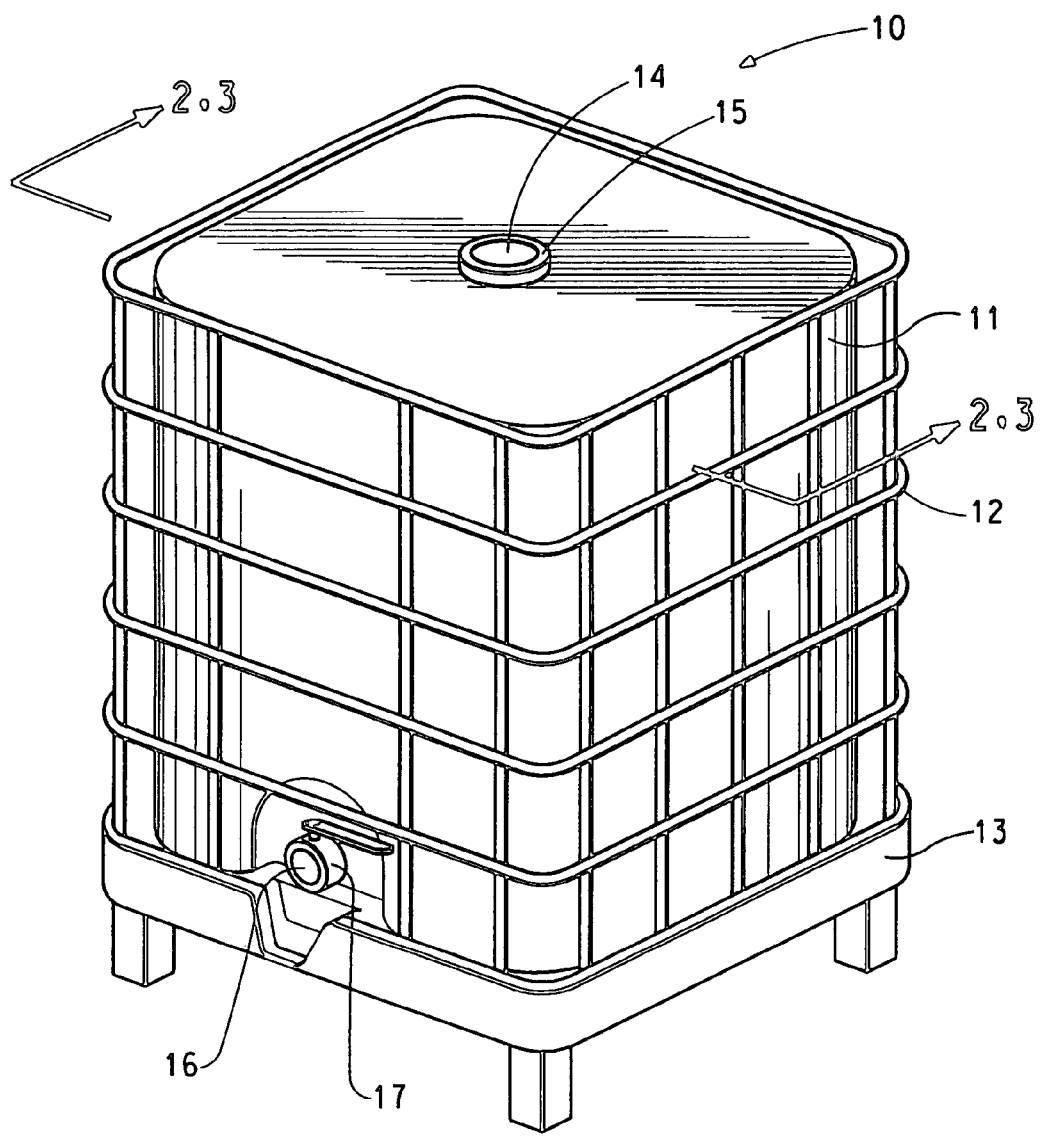
FIG. 1 perspective view of a shipping container for aqueous fluoropolymer dispersion.

The present invention relates to a process for reducing fluorosurfactant content of an aqueous fluoropolymer dispersion while the dispersion is in a shipping container. By the term "shipping container" is meant any mobile vessel designed to hold fluoropolymer dispersion after polymerization, the mobile vessel being suitable for movement to a site remote from the polymerization area. Such shipping containers include but are not limited to totes, storage drums, plastic lined fiberboard boxes and the like.

The present invention achieves reduction of fluorosurfactant content by contacting the fluorosurfactant containing fluoropolymer dispersion with a sorbent disposed in the shipping container. By the term "sorbent" is meant materials that remove fluorosurfactant from fluoropolymer dispersion, whether through absorption or adsorption or other mechanism. By reducing the fluorosurfactant content of the dispersion while it is housed in a shipping container, there is no need to add an operation devoted to fluorosurfactant removal to the manufacturing process that will impact the cycle time of the overall production. The contact time to achieve sorption in a shipping container can be short if desired, e.g., 2 hours, or leisurely, extending as long 6 months or more. Preferably the contact time is about 1 week to about 6 months, more preferably about 1 week to about 3 months. Preferably, the specific process steps, apparatus and sorbent quantity are selected to achieve the desired level of fluorosurfactant reduction during the normal storage and shipping periods. The time between production, shipment, and use typically provides sufficient time to reduce the fluorosurfactant content so that there is no added cycle time inventory costs associated with holding product in inventory longer than normal. Due to the availability of sufficient time to allow high utilization of the sorbent the amount of sorbent used is minimized and can approach the stoichiometric amount required for fluorosurfactant removal.

In a preferred embodiment of this invention, the process includes moving either the fluorosurfactant-containing aqueous fluoropolymer dispersion or the sorbent to impart movement in relation to each other during the contacting in the shipping container. In one embodiment of the invention, the normal motions of transferring the shipping container from polymerization area to storage area to shipping, including transit to the end-use customer, will provide for movement of the dispersion in relation to the sorbent. As will be shown by illustration, additional movement can be insured by configuration of the confinement structure within the container and/or by using mechanical means to impart additional movement to the dispersion in the shipping container.

The sorbent may be in the form of pellets or beads which can be easily removed from the dispersion, such as ion exchange resin beads, and in a preferred embodiment, the sorbent is confined, preferably in a confinement structure.

The invention is best illustrated with reference to the following drawings. FIG. 1. illustrates the exterior of shipping container 10 for fluoropolymer dispersion often referred to as a tote. As depicted, similar to conventional shipping containers, the container is a molded plastic vessel 11, preferably molded polypropylene, housed in a steel wire enclosure 12 giving the vessel added integrity. The container sits on a metal or wooden skid 13 which aids in the lifting, transporting and stacking of the container. The walls of the vessel are approximately 3/16 inch thick and the capacity of the container is about 275 gallons. The vessel has an opening 14 on the top surface through which the container is filled with fluoropolymer dispersion. After filling, the container opening 14 is fitted with a protective cap 15. On the front lower face of the vessel 11 is a spout 16 with valve 17 through which fluoropolymer dispersion with the aid of a hose (not shown) can be withdrawn from the container.

Figure 2:
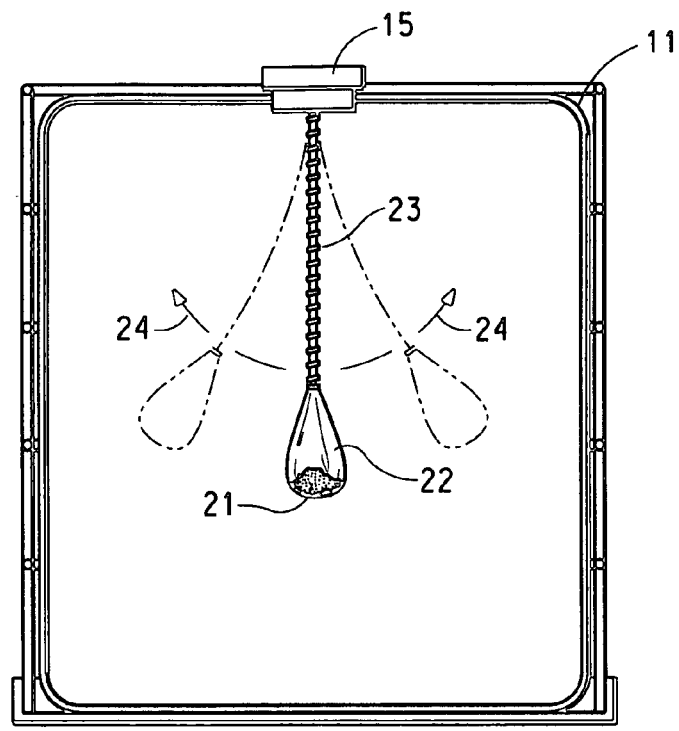
FIG. 2 is a cut away view of a shipping container for aqueous fluoropolymer dispersion showing a confinement structure containing sorbent positioned within the container.

One embodiment of the shipping container of this invention is illustrated in FIG. 2. The illustration is a cut away view along line 2,3 of FIG. 1 showing the interior of the container. Positioned within the container is a confinement structure for housing sorbent 21, specifically a fabric pouch 22. The sorbent employed in this embodiment is in the form of resin beads contained within the pouch 22. The fabric pouch preferably is made from a woven or nonwoven filter cloth such as polypropylene which is porous and allows dispersion to permeate and permit sorption of fluorosurfactant on the sorbent thereby reducing the fluorosurfactant content of the dispersion. As illustrated, the fabric pouch is tethered to the cap 15 of the molded plastic vessel 11 by means of a flexible plastic rod 23. The rod suspends the pouch into the dispersion and because of its flexibility permits movement of the pouch with the movement of the shipping container during transportation as illustrated with arrows 24. Additional movement of the dispersion relative to the sorbent is provided by the dispersion moving in the container during transportation.

Figure 3:
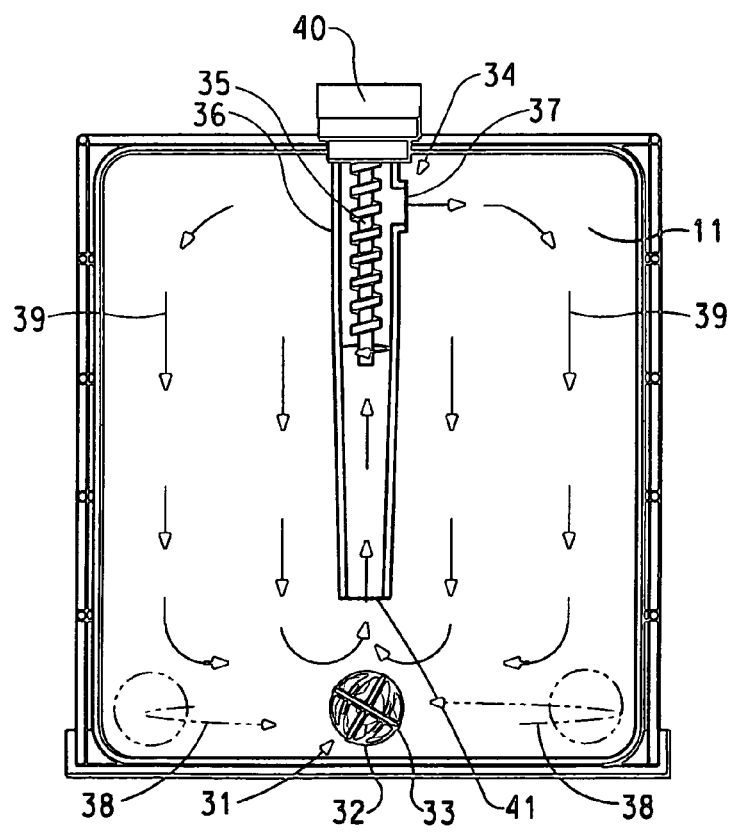
FIG. 3 is a cut away view of a shipping container for aqueous fluoropolymer dispersion showing another confinement structure containing sorbent positioned within the container and a mechanism for moving the dispersion in relation to the confinement structure.

Another embodiment of the invention is shown in FIG. 3. The illustration is a cut away view along line 2,3 of FIG. 1 showing the interior of the container. The confinement structure as illustrated is a generally rigid, porous enclosure which preferably has a generally spherical outer shape. The confinement structure positioned within the container is metal, such as stainless steel, cage 31 generally in the shape of a sphere which houses sorbent 32. The cage structure may include a screen having a mesh fine enough so that the sorbent is confined within the cage. Or, as illustrated, the sorbent within the metal cage may be housed in an additional confinement structure 33 such as the fabric pouch described above. The spherical confinement structure in this illustration is not attached to the molded plastic vessel, but rather is free to roll around the inside of the container with the movement of the shipping container as illustrated by arrows 38. Again, this configuration of the confinement structure allows dispersion to permeate the spherical cage with or without fabric pouch and permits sorption of fluorosurfactant on the sorbent thereby reducing the fluorosurfactant content of the dispersion.

As further shown in FIG. 3, a mechanism is incorporated into the shipping container for enhancing the movement of the fluorosurfactant containing dispersion in relation to the sorbent. Illustrated is a screw pump 34 penetrating the container through the upper surface of molded vessel 11 through opening 15. The screw pump 34 is comprised of a screw 35 housed in barrel 36 and a motor 40 for driving the screw 35 for moving dispersion in the shipping container through the barrel 36 and from barrel inlet 41 and out the barrel exit 37. The circulation of the dispersion through the vessel with top to bottom agitation is illustrated by flow arrows 39. This is just one illustration of many possible agitators or pump configurations that could accomplish the movement of this dispersion. Such a mechanism is especially preferred in larger shipping containers allowing movement of the dispersion within the package at a slow rate. Such circulation can be continuous or discontinuous.

Figure 4:
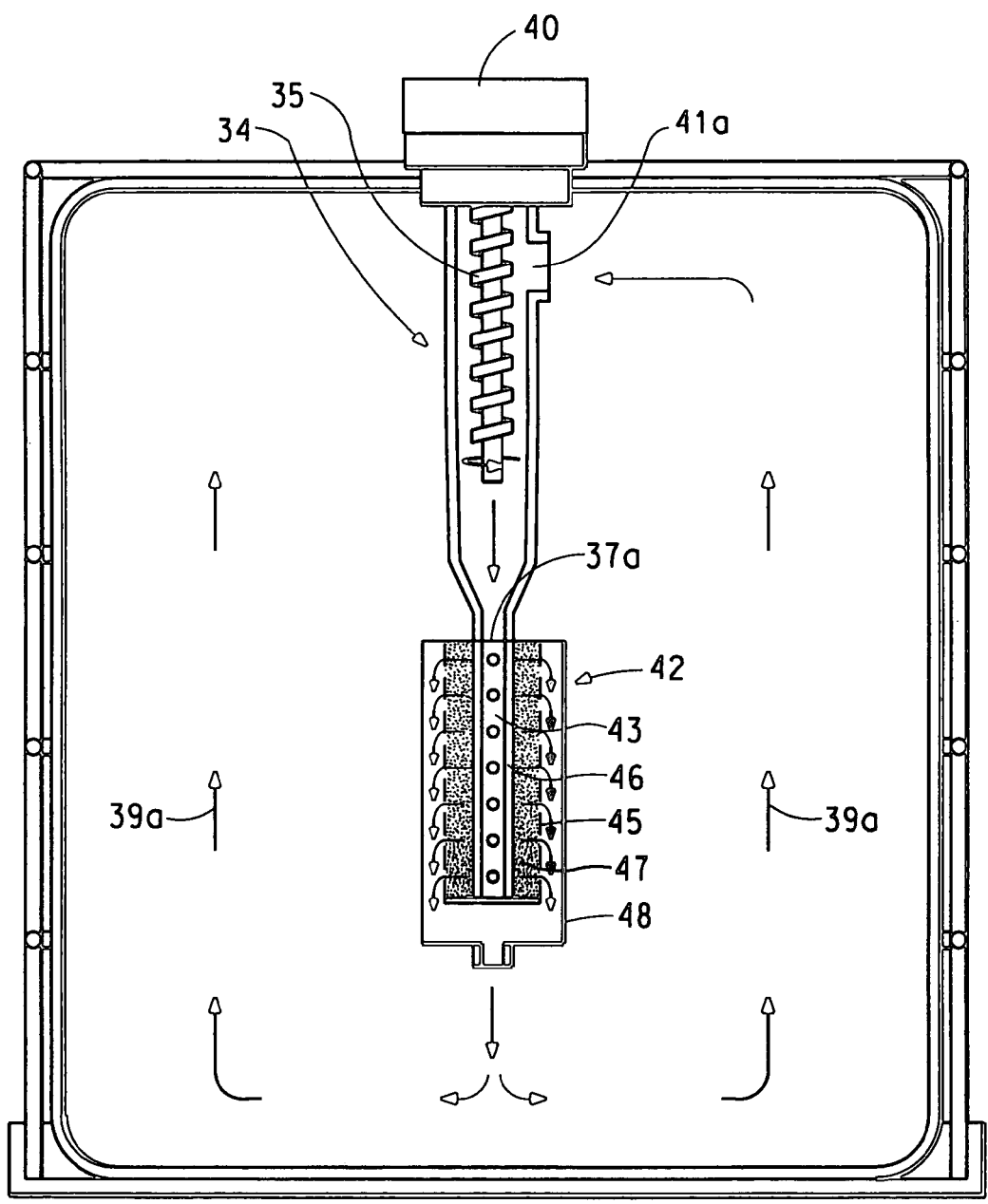
FIG. 4 is a cut away view of a shipping container for aqueous fluoropolymer dispersion showing yet another confinement structure containing sorbent positioned within the container and a mechanism for moving the dispersion in relation to the confinement structure.

In the embodiment of the invention which employs a pump for moving the dispersion in relation to the sorbent, it is advantageous to provide the sorbent in the flowing stream of dispersion provided by the pump, especially adjacent the barrel exit. A preferred embodiment of the invention employing this feature is illustrated in FIG. 4 with barrel exit 37a and barrel inlet 41a having been reconfigured from the illustration in FIG. 3 in conjunction with a reconfiguration of the circulation pattern resulting from a reverse of screw direction. The circulation of the dispersion through the vessel with top to bottom agitation is illustrated by flow arrows 39a. In FIG. 4, the confinement structure is provided by a cartridge 42 with a porous exterior provided by a large diameter perforated tube 45 and a central interior passage 43 provided by a small diameter perforated tube 46 connected to barrel exit 37 of the pump. Preferably, the porous exterior of the cartridge has a generally cylindrical shape. The pump 34 supplies dispersion to the cartridge 42. Sorbent 47 is confined in the space between the central passage and the porous exterior so that flow into the central passage causes the dispersion to flow through the sorbent and out the porous exterior. Because flow from the porous exterior will be diffuse rather than directed, the dispersion can be collected in a collector, namely collector shell 48, if desired as shown in FIG. 4, as it exits the porous exterior. Collector shell 48 can then be configured to provide more directed flow to promote circulation throughout the container. As illustrated in FIG. 4, the cartridge 42 and collector shell 48 are preferably sized so that they will pass through opening 14 in tote 10 and when the screw pump 34 is inserted through opening 14, avoiding the need for an additional or enlarged opening in the tote 10.

An additional advantage of such a movement mechanism is that gentle movement of the dispersion can ameliorate the long standing problem of short shelf life due to settling. Many fluoropolymer dispersions suffer from settling as the specific gravity of the fluoropolymer is large relative to water. In as little as 3 months, 2 to 20% of the dispersion can form a non-redispersable settled layer which represents a yield loss and waste disposal issue. Further, such a mechanism permits handling of dispersions having particles of large size and/or high aspect ratio, which dispersions are desired for the formation of flaw free films with enhanced critical cracking thickness (CCT). The continuous, gentle movement of the dispersion in the package can overcome settling deficiencies which are exaggerated by large particle size dispersions as well as provide the mass transfer which sorption such as by ion exchange requires.

In both embodiments illustrated above, the confinement structure is removable from the container permitting the sorbent to be separated from the dispersion in the container. The fluorosurfactant can be can then be recovered by removing it from the sorbent and, for example in the case of ion exchange resin, the sorbent regenerated for reuse. It is advantageous to carry out the recovery of the fluorosurfactant and/or regeneration of the sorbent with the sorbent contained in the fabric pouch since the fabric pouch readily permits flow and aids in handling of the sorbent during the recovery and/or regeneration and during subsequent handling and storage.

Fluoropolymer

The fluorosurfactant-containing aqueous fluoropolymer dispersion for treatment in accordance with the present invention is made by dispersion polymerization (also known as emulsion polymerization). The fluoropolymer dispersions are comprised of particles of polymers made from monomers wherein at least one of the monomers contains fluorine. The particles have a relative colloid stability obtained by the presence of a nonionic surfactant. The product of dispersion polymerization is used as aqueous dispersion after concentrating and/or stabilizing with added non-ionic surfactant as will be described below. The concentrated dispersions are useful as coating or impregnating compositions and to make cast films.

The fluoropolymer component of the aqueous dispersions used in this invention is independently selected from the group of polymers and copolymers of trifluoroethylene, hexafluoropropylene, monochlorotrifluoroethylene, dichlorodifluoroethylene, tetrafluoroethylene, perfluoroalkyl ethylene monomers, perfluoro(alkyl vinyl ether) monomers, vinylidene fluoride, and vinyl fluoride.

The invention is especially useful when the fluoropolymer component of the dispersion may be polytetrafluoroethylene (PTFE) including modified PTFE which is not melt-processible. Polytetrafluoroethylene (PTFE) refers to the polymerized tetrafluoroethylene by itself without any significant comonomer present. Modified PTFE refers to copolymers of TFE with such small concentrations of comonomer that the melting point of the resultant polymer is not substantially reduced below that of PTFE. The concentration of such comonomer is preferably less than 1 weight %, more preferably less than 0.5 weight %. The modified PTFE contains a small amount of comonomer modifier which improves film forming capability during baking (fusing), such as perfluoroolefin, notably hexafluoropropylene (HFP) or perfluoro (alkyl vinyl) ether (PAVE), where the alkyl group contains 1 to 5 carbon atoms, with perfluoro(ethyl vinyl) ether (PEVE) and perfluoro(propyl vinyl) ether (PPVE) being preferred. Chlorotrifluoroethylene (CTFE), perfluorobutyl ethylene (PFBE), or other monomer that introduces bulky side groups into the molecule are also included. The PTFE typically has a melt creep viscosity of at least $1 \times 10^9$ Pa·s. Such high melt viscosity indicates that the PTFE does not flow in the molten state and therefore is not melt-processible. PTFE and modified PTFE are frequently sold in dispersion form and transported in shipping containers and the process of the invention can be readily employed for reducing the fluorosurfactant content of such dispersions.

The fluoropolymer component of the dispersion may be melt-processible. By melt-processible, it is meant that the polymer can be processed in the molten state (i.e., fabricated from the melt into shaped articles such as films, fibers, and tubes etc. that exhibit sufficient strength and toughness to be useful for their intended purpose). Examples of such melt-processible fluoropolymers include copolymers of tetrafluoroethylene (TFE) and at least one fluorinated copolymerizable monomer (comonomer) present in the polymer in sufficient amount to reduce the melting point of the copolymer substantially below that of TFE homopolymer, polytetrafluoroethylene (PTFE), e.g., to a melting temperature no greater than 315° C. Such fluoropolymers include polychlorotrifluoroethylene, copolymers of tetrafluoroethylene (TFE) or chlorotrifluoroethylene (CTFE). Preferred comonomers with of TFE are perfluoroolefin having 3 to 8 carbon atoms, such as hexafluoropropylene (HFP), and/or perfluoro(alkyl vinyl ether) (PAVE) in which the linear or branched alkyl group contains 1 to 5 carbon atoms. Preferred PAVE monomers are those in which the alkyl group contains 1, 2, 3 or 4 carbon atoms, and the copolymer can be made using several PAVE monomers. Preferred TFE copolymers include FEP (TFE/HFP copolymer), PFA (TFE/PAVE copolymer), TFE/HFP/PAVE wherein PAVE is PEVE and/or PPVE and MFA (TFE/PMVE/PAVE wherein the alkyl group of PAVE has at least two carbon atoms). The melt-processible copolymer is made by incorporating an amount of comonomer into the copolymer in order to provide a copolymer which typically has a melt flow rate of about 1-100 g/10 min as measured according to ASTM D-1238 at the temperature which is standard for the specific copolymer. Typically, the melt viscosity will range from $10^2$ Pa·s to about $10^6$ Pa·s, preferably $10^3$ to about $10^5$ Pa·s measured at 372° C. by the method of ASTM D-1238 modified as described in U.S. Pat. No. 4,380,618. Additional melt-processible fluoropolymers are the copolymers of ethylene or propylene with TFE or CTFE, notably ETFE, ECTFE and PCTFE. Further useful polymers are film forming polymers of polyvinylidene fluoride (PVDF) and copolymers of vinylidene fluoride as well as polyvinyl fluoride (PVF) and copolymers of vinyl fluoride.

A typical process for the aqueous dispersion polymerization of preferred polymer PTFE is a process wherein TFE vapor is fed to a heated reactor containing a weak acid, fluorosurfactants, paraffin wax and deionized water. A free-radical initiator solution is added and, as the polymerization proceeds, additional TFE is added to maintain the pressure. The exothermic heat of reaction is removed by circulating cooling water through the reactor jacket. After several hours, the feeds are stopped, the reactor is vented and purged with nitrogen, and the raw dispersion in the vessel is transferred to a cooling vessel. Paraffin wax is removed and polymer dispersion is transferred either to a coagulation operation where fine power is produced or a dispersion concentration operation which produces dispersions which are especially useful for the practice of the present invention. In the dispersion concentration operation, the dispersion is concentrated with the aid of a non-ionic surfactant as taught in Marks et al in U.S. Pat. No. 3,037,953 and U.S. Pat. No. 3,704,272 to Holmes to raise the solids from nominally 35 wt % to about 60 wt %. The dispersion is then transferred to shipping containers.

The dispersion polymerization of melt-processible TFE copolymers is similar except that one or more comonomers are added to the batch initially and/or introduced during polymerization. In addition, a telogen such as a hydrocarbon is employed to control the molecular weight to achieve the desired melt flow of the polymer for the intended purpose. The same dispersion concentration operation used for PTFE dispersions can be used for TFE copolymer dispersions.

Fluorosurfactant-containing fluoropolymer dispersions with solids content of 15-70 wt %, preferably 25-65 wt %, are beneficially treated by the present invention. In contrast to the prior art, the present invention is especially useful by being readily able to treat up-concentrated dispersions with solids content as high as 70%. Even though the higher density and decreased flow rates of these compositions would be problematic in a stirred tank or extraction column where a high stirring or flow rate in necessary to achieve adequate reduction in fluorosurfactant content during the time available, such considerations are a minor concern when a sorbent is contacted with the concentrated dispersions in the shipping container. By conducting the fluorosurfactant reduction in a shipping container, sufficient contact time between the sorbent and the dispersion is available, even for more viscous liquids, and high stirring or flow rates are not needed.

The present invention permits reducing the fluorosurfactant content of a fluorosurfactant-containing dispersion to a predetermined level, preferably a level no greater than about 300 ppm, more preferably a predetermined level no greater than about 100 ppm, especially a predetermined level no greater than about 50 ppm. Based on the expected contact time during storage and shipping, the amount of the sorbent is selected to reduce the fluorosurfactant content to no greater than the desired predetermined level.

Fluorosurfactants

The fluorosurfactant in the fluorosurfactant-containing dispersions to be reduced in this process is a non-telogenic, ionizable dispersing agent, soluble in water and comprising an ionic hydrophilic group and a hydrophobic portion. Preferably, the hydrophobic portion is an aliphatic fluoroalkyl group containing at least six carbon atoms, all except at most one of which, and that one the closest to the solubilizing group, bearing at least two fluorine atoms, the terminal carbon atom bearing in addition an atom consisting of hydrogen or fluorine. These fluorosurfactants are used as a polymerization aid for dispersing and because they do not chain transfer they inhibit formation of polymer with undesirable short chain length. An extensive list of suitable fluorosurfactants is disclosed in U.S. Pat. No. 2,559,752 to Berry. Preferably, the fluorosurfactant is a perfluorinated carboxylic acid having 6-10 carbon atoms and is typically used in salt form. Suitable fluorosurfactants are ammonium perfluorocarboxylates, e.g., ammonium perfluorocaprylate or ammonium perfluorooctanoate. The fluorosurfactants are usually present in the amount of 0.02 to 1 wt % with respect to the amount of polymer formed.

Sorbents

As defined previously, by the term sorbent is meant materials that remove fluorosurfactant from fluoropolymer dispersion, whether through absorption or adsorption or other mechanism. Examples of possible sorbents include carbon particles and ion exchange resins. For the practice of this invention, the sorbent is preferably an ion exchange resin, more preferably anionic and can be either weakly basic or strongly basic. Suitable weakly basic anion exchange resins contain primary, secondary amine, tertiary amine, or hydroxy amino groups in the form of the ammonium salts. Suitable strongly basic anion exchange resin contain quaternary ammonium groups. Strong base ion exchange resins have the advantage of less sensitivity to the pH of the media. Ion exchange resins in the form of a hydroxyl counter ion are preferred. Ion exchange resins with chloride, sulfate, and nitrate have also been used for the removal of the fluorosurfactant. Examples of suitable commercially-available ion exchange resins include: Dowex 550A, US Filter A464-OH, US Filter A244-OH, Sybron M-500-OH, Sybron ASB1-OH, Purolite A-500-OH, Itochu TSA 1200, Amberlite IR 402

Elution of fluorosurfactant such as a perfluorinated carboxylic acid adsorbed on the anion exchange resin is readily achieved by use of ammonia solution as demonstrated by Seki in U.S. Pat. No. 3,882,153, by a mixture of dilute mineral acid with organic solvent (e.g., HCl/ethanol) as demonstrated by Kuhls in U.S. Pat. No. 4,282,162, or by strong mineral acids such as sulfuric acid and nitric, transferring the adsorbed fluorinated carboxylic acid to the eluent. The fluorosurfactant in the eluent in high concentration can easily be recovered in the form of a pure acid or in the form of salts by common methods such as acid-deposition, salting out, concentration etc.

In a further preferred aspect of employing this invention, customers are able to return shipping containers to a polymer manufacturer or recycle agent where the sorbent is retrieved from the shipping containers and treated to recover the expensive fluorosurfactant and regenerate the sorbent. The recovered fluorosurfactant can be recycled for additional polymer manufacture and the ion exchange resin can be regenerated for reuse. When a fabric pouch is used to contain the sorbent, it is advantageous to carry out the recovery of the fluorosurfactant and/or regeneration of the sorbent with the sorbent contained in the fabric pouch since the fabric pouch readily permits flow and aids in handling of the sorbent during the recovery and/or regeneration and during subsequent handling and storage.

What is claimed is:

1. A process for reducing fluorosurfactant content of a fluorosurfactant-containing aqueous fluoropolymer dispersion stabilized with nonionic surfactant comprising:

filling a shipping container with said fluorosurfactant-containing aqueous fluoropolymer dispersion, wherein said shipping container is a mobile vessel designed to hold fluoropolymer dispersion after polymerization and suitable for movement to a site remote from the polymerization area; contacting said fluorosurfactant-containing aqueous fluoropolymer dispersion with a fluorosurfactant sorbent in said shipping container to reduce fluorosurfactant content, wherein said sorbent is confined during said contacting by a porous confinement structure positioned within said shipping container, said porous confinement structure allowing said dispersion to permeate and contact said sorbent; and moving either said fluorosurfactant-containing aqueous fluoropolymer dispersion or said confinement structure to impart movement of said dispersion and sorbent in relation to each other during said contacting, wherein said contacting of said fluorosurfactant-containing aqueous fluoropolymer dispersion with a fluorosurfactant sorbent is performed for a contact time of about 1 week to about 6 months.

2. The process of claim 1 where said sorbent is ion exchange resin.

3. The process of claim 2 wherein said ion exchange resin is anion exchange resin.

4. The process of claim 1 wherein the amount of said sorbent contacted with said fluorosurfactant-containing aqueous fluoropolymer dispersion is selected to reduce the fluorosurfactant content to no greater than a predetermined level.

5. The process of claim 4 wherein said predetermined level is no greater than about 300 ppm.

6. The process of claim 4 wherein said predetermined level is no greater than about 100 ppm.

7. The process of claim 4 wherein said predetermined level is no greater than about 50 ppm.

8. The process of claim 1 wherein said confinement structure comprises a fabric pouch.

9. The process of claim 1 wherein said confinement structure comprises a generally rigid porous enclosure.

10. The process of claim 1 wherein said confinement structure is moved in relation to the dispersion during said contacting.

11. The process of claim 1 wherein said dispersion is moved in relation to said confinement structure during said contacting.

12. The process of claim 11 wherein said moving of said fluorosurfactant-containing aqueous fluoropolymer dispersion in relation to said confinement structure is performed using a pump.

13. The process of claim 12 wherein said confinement structure is a cartridge containing sorbent and said pump supplies dispersion to said cartridge.

14. The process of claim 13 wherein said cartridge has a central interior passage for receiving dispersion from said pump, said sorbent surrounding said central interior passage so that dispersion supplied by said pump into said central passage causes dispersion to flow through the sorbent.

15. The process of claim 14 wherein said cartridge further comprises a collector for receiving dispersion with reduced fluorosurfactant content and returning dispersion into said shipping container to cause circulation of dispersion within said container.

16. The process of claim 1 further comprising separating said sorbent from said dispersion after the fluorosurfactant content of said dispersion is reduced.

17. The process of claim 1 wherein said fluoropolymer dispersion is a concentrated fluoropolymer dispersion containing nonionic surfactant.

18. The process of claim 1 wherein said dispersion has a fluoropolymer solids concentration of about 15 to about 70 weight percent.

* * * * *